US011520617B2

(12) United States Patent
Hayes et al.

(10) Patent No.: US 11,520,617 B2
(45) Date of Patent: *Dec. 6, 2022

(54) MODIFYING ACCESS PRIVILEGES TO SECURE RESOURCES IN AN AUTONOMOUS VEHICLE

(71) Applicant: GHOST AUTONOMY INC., Mountain View, CA (US)

(72) Inventors: John Hayes, Mountain View, CA (US); Volkmar Uhlig, Cupertino, CA (US)

(73) Assignee: GHOST AUTONOMY INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/328,616

(22) Filed: May 24, 2021

(65) Prior Publication Data

US 2021/0286642 A1 Sep. 16, 2021

Related U.S. Application Data

(63) Continuation of application No. 16/382,493, filed on Apr. 12, 2019, now Pat. No. 11,016,797.

(51) Int. Cl.
*G06F 9/455* (2018.01)
*G05D 1/02* (2020.01)

(52) U.S. Cl.
CPC .......... *G06F 9/45558* (2013.01); *G05D 1/02* (2013.01); *G06F 2009/45587* (2013.01)

(58) Field of Classification Search
CPC ............................. G06F 9/45558; G05D 1/02
USPC ...................................................... 718/1–108
See application file for complete search history.

(56) References Cited

U.S. PATENT DOCUMENTS

| 2006/0136910 | A1* | 6/2006 | Brickell | G06F 21/52 718/1 |
| 2009/0327462 | A1* | 12/2009 | Adams | H04L 61/5046 718/1 |
| 2010/0223613 | A1 | 9/2010 | Schneider | |
| 2011/0239213 | A1* | 9/2011 | Aswani | G06F 9/45558 718/1 |
| 2012/0151209 | A1* | 6/2012 | Visnyak | H04L 63/105 713/166 |
| 2013/0067465 | A1* | 3/2013 | Fuhrman | G06F 11/1484 718/1 |

(Continued)

OTHER PUBLICATIONS

Zografopoulos, Ioannis, et al. "Cyber-physical energy systems security: Threat modeling, risk assessment, resources, metrics, and case studies." IEEE Access 9 (2021): pp. 29775-29818. (Year: 2021).*

(Continued)

*Primary Examiner* — Satish Rampuria

(57) ABSTRACT

Device security across multiple operating system modalities, including: allocating, by a hypervisor, to a first virtual machine comprising a first operating system, based on the first modality, a first one or more access privileges to one or more resources; allocating, by the hypervisor, to a second virtual machine comprising a second operating system, based on the second modality, a second one or more access privileges to the one or more resources; and modifying, by the hypervisor, the second one or more access privileges in response to a change in an execution state of the first virtual machine.

18 Claims, 8 Drawing Sheets

(56) References Cited

U.S. PATENT DOCUMENTS

2015/0146716 A1* 5/2015 Olivier .................... H04L 65/80
370/352
2016/0328254 A1* 11/2016 Ahmed ............... G06F 9/45558

OTHER PUBLICATIONS

Canetti, Ran, Ben Riva, and Guy N. Rothblum. "Practical delegation of computation using multiple servers." Proceedings of the 18th ACM conference on Computer and communications security. 2011. pp. 445-454 (Year: 2011).*

Kaashoek, M. Frans, et al. "Server operating systems." Proceedings of the 7th workshop on ACM SIGOPS European workshop: Systems support for worldwide applications. 1996.pp. 141-148 (Year: 1996).*

Ioannidis et al., "Sub-Operating Systems: A New Approach to Application Security", Proceedings of the 10th Workshop on ACM SIGOPS European Workshop, Jul. 2002, pp. 108-115, ACM New York.

Kwon et al., "Virtualizing Performance Asymmetric Multi-core Systems," 2011 28th Annual International Symposium on Computer Architecture (ISCA), IEEE Xplore, 2011, downloaded Sep. 10, 2020, 12 pages.

Perez-Botero et al., "Characterizing Hypervisor Vulnerabilites in Cloud Computing Servers," Proceedings of the 2013 International Workshop on Security in Cloud Computing, May 2013, 8 pages.

Szefer et al., "Eliminating the Hypervisor Attack Surface fora More Secure Cloud," Proceedings of the 18th ACM Conference on Computer and Communications Security, Oct. 2011, 12 pages.

Teo et al., "Supporting Access Control Policies Across Multiple Operating Systems", Proceedings of the 43rd Annual Southeast Regional Conference—vol. 2, Mar. 2005, pp. 288-293, ACM, New York.

Xu et al., "Controlled-Channel Attacks: Deterministic Side Channels for Untrusted Operating Systems", 2015 IEEE Symposium on Security and Privacy, May 2015, pp. 640-656, IEEE Computer Society, DOI: 10.1109/SP.2015.45.

\* cited by examiner

MODIFYING ACCESS PRIVILEGES TO SECURE RESOURCES IN AN AUTONOMOUS VEHICLE

CROSS-REFERENCE TO RELATED APPLICATIONS

This application is a continuation of and claims priority to U.S. Pat. No. 11,016,797, issued May 25, 2021, which is hereby incorporated by reference in its entirety.

BACKGROUND

Field of the Invention

The field of the invention is data processing, or, more specifically, methods, apparatus, autonomous vehicles, and products for device security across multiple operating system modalities.

Description of Related Art

Operating systems of virtual machines may each require access to particular resources to perform their functions. Allowing full access to all devices by all virtual machines presents security vulnerabilities.

SUMMARY

Device security across multiple operating system modalities may include allocating, by a hypervisor, to a first virtual machine comprising a first operating system of a first modality, based on the first modality, a first one or more access privileges to one or more resources; and allocating, by the hypervisor, to a second virtual machine comprising a second operating system of a second modality, based on the second modality, a second one or more access privileges to the one or more resources.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
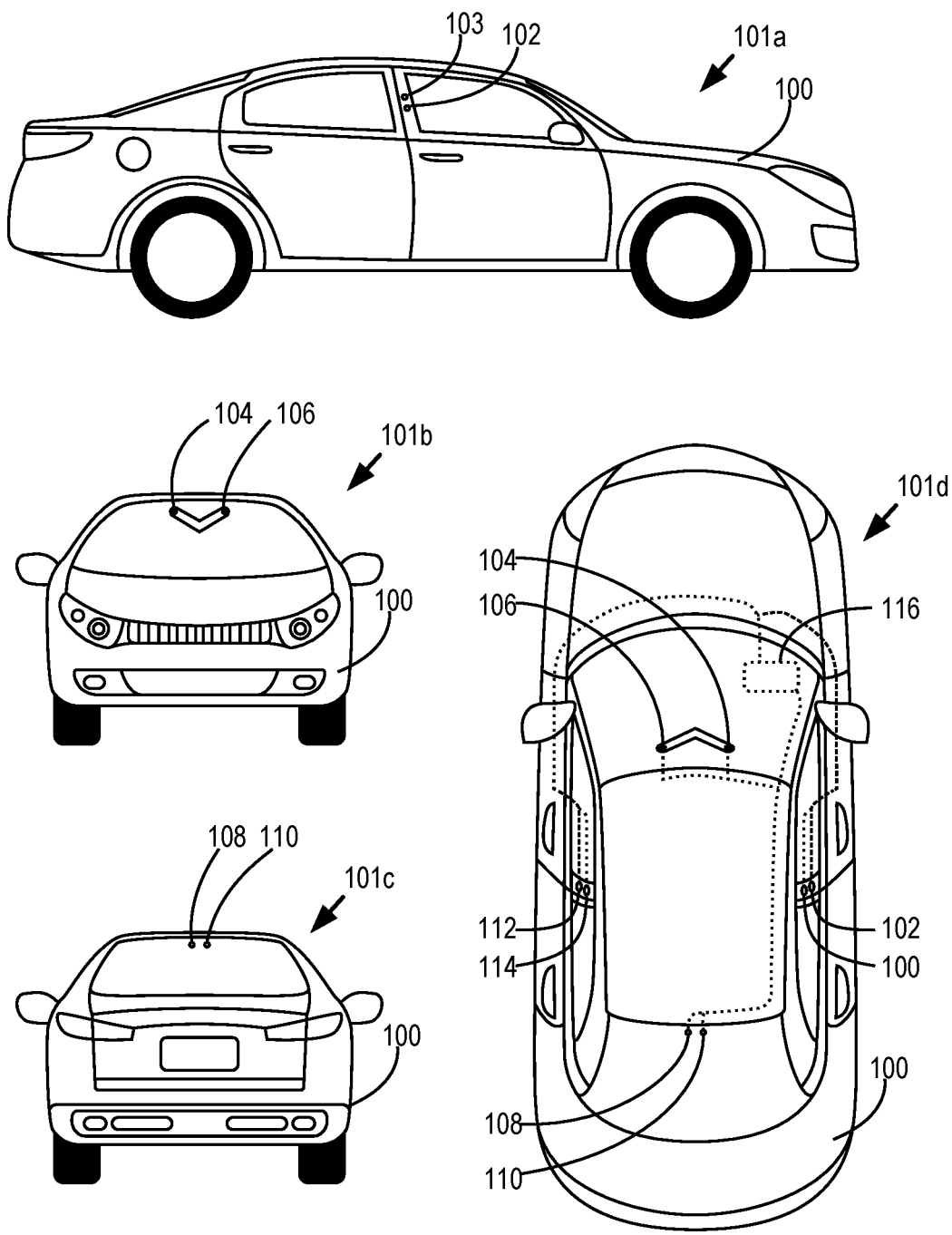
FIG. 1 shows example views of an autonomous vehicle for device security across multiple operating system modalities.

Example methods, apparatus, autonomous vehicles, and products for device security across multiple operating system modalities are described with reference to the accompanying drawings, beginning with FIG. 1. FIG. 1 shows multiple views of an autonomous vehicle 100 configured to carry out operating system modality switching in accordance with some embodiments of the present disclosure. Right side view 101a shows a right side of the autonomous vehicle 100, where sensors 102 and 103 are mounted on or otherwise affixed to the right side of the autonomous vehicle 100. The sensors 102 and 103 that are mounted on or otherwise affixed to the autonomous vehicle 100 may be configured to capture image data, video data, audio data, or any other data (including combinations thereof) that can be used to determine the environmental state of the autonomous vehicle 100 from the perspective of the right side of the autonomous vehicle 100.

Front view 101b shows a front side of the autonomous vehicle 100, where sensors 104 and 106 are mounted on or otherwise affixed to the front side of the autonomous vehicle 100. The sensors 104 and 106 that are mounted on or otherwise affixed to the front side of the autonomous vehicle 100 may be configured to capture image data, video data, audio data, or any other data (including combinations thereof) that can be used to determine the environmental state of the autonomous vehicle 100 from the perspective of the front side of the autonomous vehicle 100.

Rear view 101c shows a rear side of the autonomous vehicle 100, where sensors 108 and 110 are mounted on or otherwise affixed to the rear side of the autonomous vehicle 100. The sensors 108 and 110 that are mounted on or otherwise affixed to the rear side of the autonomous vehicle 100 may be configured to capture image data, video data, audio data, or any other data (including combinations thereof) that can be used to determine the environmental state of the autonomous vehicle 100 from the perspective of the rear side of the autonomous vehicle 100.

Top view 101d shows an overhead view of the autonomous vehicle 100. Shown in the top view 101d are sensors 102-110 as illustrated in previous views, as well as sensors 112 and 114 that are mounted on or otherwise affixed to the left side of the autonomous vehicle 100. The sensors 112 and 114 that are mounted on or otherwise affixed to the left side of the autonomous vehicle 100 may be configured to capture image data, video data, audio data, or any other data (including combinations thereof) that can be used to determine the environmental state of the autonomous vehicle 100 from the perspective of the left side of the autonomous vehicle 100. Readers will appreciate that the placement of the sensors 102-114 is merely for illustrative purposes and in no way represents a limitation on the arrangement of sensors, the manner in which the sensors are attached to the autonomous vehicle 100, and so on.

Further shown in the top view 101d is an automation computing system 116. The automation computing system 116 can include one or more computing devices configured to evaluate the environmental state of the autonomous vehicle 100, control one or more autonomous operations (e.g., autonomous driving operations) of the autonomous vehicle 100 in coordination with other components of the autonomous vehicle 100, and perform other tasks as will be explained in greater detail below. In such an example, the one or more computing devices may be configured to control one or more autonomous operations of the autonomous vehicle 100 through the use of one or more modules of computer program instructions that are executing on one or more of the computing devices. For example, the automation computing system 116 may be configured to process sensor data (e.g., data from the sensors 102-114 and potentially other sensors), operational data (e.g., a speed, acceleration, gear, orientation, turning direction), and other data to determine an operational state and/or operational history of the autonomous vehicle. The automation computing system 116 may then determine one or more operational commands for the autonomous vehicle (e.g., a change in speed or acceleration, a change in brake application, a change in gear, a change in turning or orientation, etc.) that may be effected via coordination between the automation computing system 116 and other components within the autonomous vehicle 100. For example, the automation computing system 116 may be coupled, directly or indirectly, for data communications with a device that can control the operation of a steering system within the autonomous vehicle 100. In such an example, if an analysis of sensor data causes the automation computing system 116 to determine that the direction of the autonomous vehicle 100 should be altered, the automation computing system 116 may issue one or more commands to the device that can control the operation of the steering system within the autonomous vehicle 100, thereby causing the device that can control the operation of a steering system within the autonomous vehicle 100 to change the direction of the autonomous vehicle by manipulating the steering system within the autonomous vehicle 100. The automation computing system 116 may also capture and store sensor data. Operational data of the autonomous vehicle may also be stored in association with corresponding sensor data, thereby indicating the operational data of the autonomous vehicle 100 at the time the sensor data was captured.

Although the autonomous vehicle 100 of FIG. 1 is shown as car, it is understood that autonomous vehicles 100 in accordance with embodiments of the present disclosure may also include other vehicles, including motorcycles, planes, helicopters, unmanned aerial vehicles (UAVs, e.g., drones), or other vehicles as can be appreciated. Moreover, it is understood that additional sensors or other external sensors may also be included in the autonomous vehicle 100.

Figure 2:
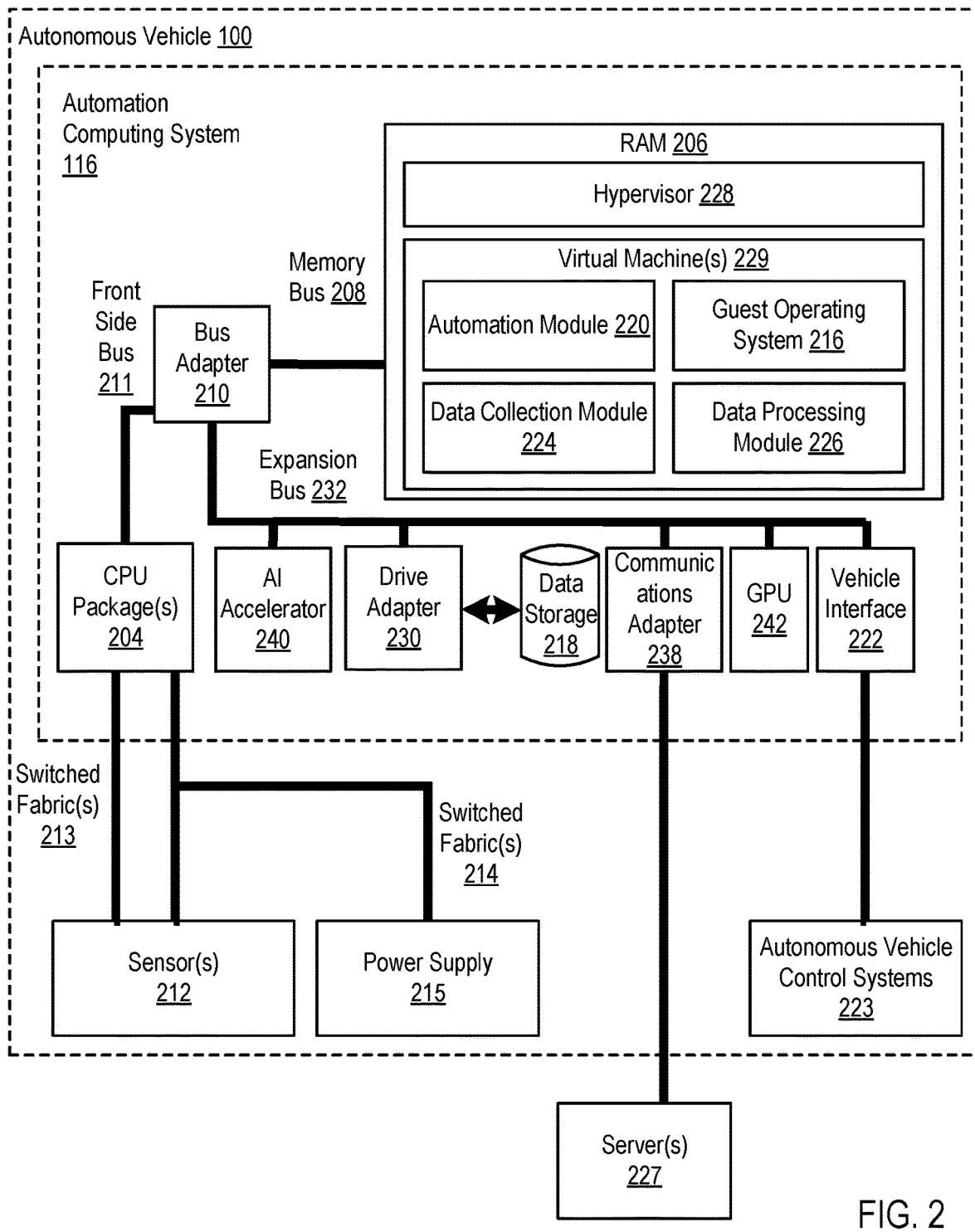
FIG. 2 is block diagram of an autonomous computing system for device security across multiple operating system modalities.

For further explanation, FIG. 2 sets forth a block diagram of automated computing machinery comprising an exemplary automation computing system 116 according to some embodiments of the present disclosure. The automation computing system 116 of FIG. 2 includes at least one computer Central Processing Unit ('CPU') package 204 as well as random access memory 206 ('RAM') which is connected through a data communications link (e.g., a bus) to the CPU packages 204 and to other components of the automation computing system 116.

A CPU package 204 may comprise a plurality of processing units. For example, each CPU package 204 may comprise a logical or physical grouping of a plurality of processing units. Each processing unit may be allocated a particular process for execution. Moreover, each CPU package 204 may comprise one or more redundant processing units. A redundant processing unit is a processing unit not allocated a particular process for execution unless a failure occurs in another processing unit. For example, when a given processing unit allocated a particular process fails, a redundant processing unit may be selected and allocated the given process. A process may be allocated to a plurality of processing units within the same CPU package 204 or different CPU packages 204. For example, a given process may be allocated to a primary processing unit in a CPU package 204. The results or output of the given process may be output from the primary processing unit to a receiving process or service. The given process may also be executed in parallel on a secondary processing unit. The secondary processing unit may be included within the same CPU package 204 or a different CPU package 204. The secondary processing unit may not provide its output or results of the process until the primary processing unit fails. The receiving process or service may then receive data from the secondary processing unit and a redundant processing unit may then be selected and have allocated the given process to ensure that two or more processing units are allocated the given process for redundancy and increased reliability.

The CPU packages 204 are communicatively coupled to one or more sensors 212. The sensors 212 may be configured to capture sensor data describing the operational and environmental conditions of an autonomous vehicle. For example, the sensors 212 may include sensors (e.g., the sensors 102-114 of FIG. 1), accelerometers, Global Positioning System (GPS) radios, Lidar sensors, or other sensors as can be appreciated. Although the sensors 212 are shown as being external to the automation computing system 116, it is understood that one or more of the sensors 212 may reside as a component of the automation computing system 212 (e.g., on the same board, within the same housing or chassis). The sensors 212 may be communicatively coupled with the CPU packages 204 via a switched fabric 213.

The switched fabric 213 comprises a communications topology through which the CPU packages 204 and sensors 212 are coupled via a plurality of switching mechanisms (e.g., latches, switches, crossbar switches, field programmable gate arrays (FPGAs), etc.). For example, the switched fabric 213 may implement a mesh connection connecting the CPU packages 204 and sensors 212 as endpoints, with the switching mechanisms serving as intermediary nodes of the mesh connection. The CPU packages 204 and sensors 212 may be in communication via a plurality of switched fabrics 213. For example, each of the switched fabrics 213 may include the CPU packages 204 and sensors 212, or a subset of the CPU packages 204 and sensors 212, as endpoints. Each switched fabric 213 may also comprise a respective plurality of switching components. The switching components of a given switched fabric 213 may be independent (e.g., not connected) of the switching components of other switched fabrics 213 such that only switched fabric 213 endpoints (e.g., the CPU packages 204 and sensors 212) are overlapping across the switched fabrics 213. This provides redundancy such that, should a connection between a CPU package 204 and sensor 212 fail in one switched fabric 213, the CPU package 204 and sensor 212 may remain connected via another switched fabric 213. Moreover, in the event of a failure in a CPU package 204, a processor of a CPU package 204, or a sensor, a communications path excluding the failed component and including a functional redundant component may be established.

The CPU packages 204 and sensors 212 are configured to receive power from one or more power supplies 215. The power supplies 215 may comprise an extension of a power system of the autonomous vehicle 100 or an independent power source (e.g., a battery). The power supplies 215 may supply power to the CPU packages 204 and sensors 212 by another switched fabric 214. The switched fabric 214 provides redundant power pathways such that, in the event of a failure in a power connection, a new power connection pathway may be established to the CPU packages 204 and sensors 214.

Stored in RAM 206 is an automation module 220. The automation module 220 may be configured to process sensor data from the sensors 212 to determine one or more operational commands for an autonomous vehicle 100 to affect the movement, direction, or other function of the autonomous vehicle 100, thereby facilitating autonomous driving or operation of the vehicle. Such operational commands may include a change in the speed of the autonomous vehicle 100, a change in steering direction, a change in gear, or other command as can be appreciated. For example, the automation module 220 may provide sensor data and/or processed sensor data as one or more inputs to a trained machine learning model (e.g., a trained neural network) to determine the one or more operational commands. The operational commands may then be communicated to autonomous vehicle control systems 223 via a vehicle interface 222. The autonomous vehicle control systems 223 are configured to affect the movement and operation of the autonomous vehicle 100. For example, the autonomous vehicle control systems 223 may turn or otherwise change the direction of the autonomous vehicle 100, accelerate or decelerate the autonomous vehicle 100, change a gear of the autonomous vehicle 100, or otherwise affect the movement and operation of the autonomous vehicle 100.

In the example depicted in FIG. 2, a data collection module 224 configured to process and/or store sensor data received from the one or more sensors 212 is depicted as being stored in RAM. The data collection module 224 may be configured to store the sensor data as captured by the one or more sensors 212, or processed sensor data 212 (e.g., sensor data 212 having object recognition, compression, depth filtering, or other processes applied). Such processing may be performed by the data collection module 224 in real-time or in substantially real-time as the sensor data is captured by the one or more sensors 212. The processed sensor data may then be used by other functions or modules. For example, the automation module 220 may use processed sensor data as input to determine one or more operational commands. The data collection module 224 may store the sensor data in data storage 218.

Also stored in RAM 206 is a data processing module 226. The data processing module 226 is configured to perform one or more processes on stored sensor data (e.g., stored in data storage 218 by the data collection module 218) prior to upload to a server 227. Such operations can include filtering, compression, encoding, decoding, or other operations as can be appreciated. The data processing module 226 may then communicate the processed and stored sensor data to the server 227. Readers will appreciate that although the embodiment depicted in FIG. 2 relates to an embodiment where the data processing module 226 communicates the processed and stored sensor data to the server 227, in other embodiments, the data processing module 226 may communicate with other types of environments such a cloud computing environment, data warehouse, or any other endpoint that may receive data from the autonomous vehicle 100.

Further stored in RAM 206 is a hypervisor 228. The hypervisor 228 is configured to manage the configuration and execution of one or more virtual machines 229. For example, each virtual machine 229 may emulate and/or simulate the operation of a computer. Accordingly, each virtual machine 229 may comprise a guest operating system 216 for the simulated computer. The hypervisor 228 may manage the creation of a virtual machine 229 including installation of the guest operating system 216. The hypervisor 228 may also manage when execution of a virtual machine 229 begins, is suspended, is resumed, or is terminated. The hypervisor 228 may also control access to computational resources (e.g., processing resources, memory resources, device resources) by each of the virtual machines.

Each of the virtual machines 229 may be configured to execute one or more of the automation module 220, the data collection module 224, the data processing module 226, or combinations thereof. Moreover, as is set forth above, each of the virtual machines 229 may comprise its own guest operating system 216. Guest operating systems 216 useful in autonomous vehicles in accordance with some embodiments of the present disclosure include UNIX™, Linux™, Microsoft Windows™, AIX™, IBM's i OS™, and others as will occur to those of skill in the art. For example, the autonomous vehicle 100 may be configured to execute a first operating system when the autonomous vehicle is in an autonomous (or even partially autonomous) driving mode and the autonomous vehicle 100 may be configured to execute a second operating system when the autonomous vehicle is not in an autonomous (or even partially autonomous) driving mode. In such an example, the first operating system may be formally verified, secure, and operate in real-time such that data collected from the sensors 212 are processed within a predetermined period of time, and autonomous driving operations are performed within a predetermined period of time, such that data is processed and acted upon essentially in real-time. Continuing with this example, the second operating system may not be formally verified, may be less secure, and may not operate in real-time as the tasks that are carried out (which are described in greater detail below) by the second operating system are not as time-sensitive the tasks (e.g., carrying out self-driving operations) performed by the first operating system.

Readers will appreciate that although the example included in the preceding paragraph relates to an embodiment where the autonomous vehicle 100 may be configured to execute a first operating system when the autonomous vehicle is in an autonomous (or even partially autonomous) driving mode and the autonomous vehicle 100 may be configured to execute a second operating system when the autonomous vehicle is not in an autonomous (or even partially autonomous) driving mode, other embodiments are within the scope of the present disclosure. For example, in another embodiment one CPU (or other appropriate entity such as a chip, CPU core, and so on) may be executing the first operating system and a second CPU (or other appropriate entity) may be executing the second operating system, where switching between these two modalities is accomplished through fabric switching, as described in greater detail below. Likewise, in some embodiments, processing resources such as a CPU may be partitioned where a first partition supports the execution of the first operating system and a second partition supports the execution of the second operating system.

The guest operating systems 216 may correspond to a particular operating system modality. An operating system modality is a set of parameters or constraints which a given operating system satisfies, and are not satisfied by operating systems of another modality. For example, a given operating system may be considered a "real-time operating system" in that one or more processes executed by the operating system must be performed according to one or more time constraints. For example, as the automation module 220 must make determinations as to operational commands to facilitate autonomous operation of a vehicle. Accordingly, the automation module 220 must make such determinations within one or more time constraints in order for autonomous operation to be performed in real time. The automation module 220 may then be executed in an operating system (e.g., a guest operating system 216 of a virtual machine 229) corresponding to a "real-time operating system" modality. Conversely, the data processing module 226 may be able to perform its processing of sensor data independent of any time constrains, and may then be executed in an operating system (e.g., a guest operating system 216 of a virtual machine 229) corresponding to a "non-real-time operating system" modality.

As another example, an operating system (e.g., a guest operating system 216 of a virtual machine 229) may comprise a formally verified operating system. A formally verified operating system is an operating system for which the correctness of each function and operation has been verified with respect to a formal specification according to formal proofs. A formally verified operating system and an unverified operating system (e.g., one that has not been formally verified according to these proofs) can be said to operate in different modalities.

The automation module 220, data collection module 224, data collection module 224, data processing module 226, hypervisor 228, and virtual machine 229 in the example of FIG. 2 are shown in RAM 206, but many components of such software typically are stored in non-volatile memory also, such as, for example, on data storage 218, such as flash storage. Moreover, any of the automation module 220, data collection module 224, and data processing module 226 may be executed by a virtual machine 229 and facilitated by a guest operating system 216 of that virtual machine 229.

The exemplary automation computing system 116 of FIG. 2 includes a communications adapter 238 for data communications with other computers and for data communications with a data communications network. Such data communications may be carried out through data communications networks such as IP data communications networks, and in other ways as will occur to those of skill in the art. Communications adapters implement the hardware level of data communications through which one computer sends data communications to another computer, directly or through a data communications network. Examples of communications adapters useful in autonomous vehicle according to some embodiments of the present disclosure include 802.11 adapters for wireless data communications, mobile adapters (e.g., 4G communications adapters, LTE communications adapters, 5G communications adapters) for mobile data communications, and others. For example, the automation computing system 116 may communicate with one or more remotely disposed servers 227, or other communications endpoint as described above, via the communications adapter 238.

The exemplary automation computing system of FIG. 2 also includes one or more Artificial Intelligence (AI) accelerators 240. The AI accelerator 240 provides hardware-based assistance and acceleration of AI-related functions, including machine learning, computer vision, etc. Accordingly, performance of any of the automation module 220, data collection module 224, data processing module 226, or other operations of the automation computing system 116 may be performed at least in part by the AI accelerators 240.

The exemplary automation computing system of FIG. 2 also includes one or more graphics processing units (GPUs) 242. The GPUs 242 are configured to provide additional processing and memory resources for processing image and/or video data, including encoding, decoding, etc. Accordingly, performance of any of the automation module 220, data collection module 224, data processing module 226, or other operations of the automation computing system 116 may be performed at least in part by the GPUs 242.

Figure 3:
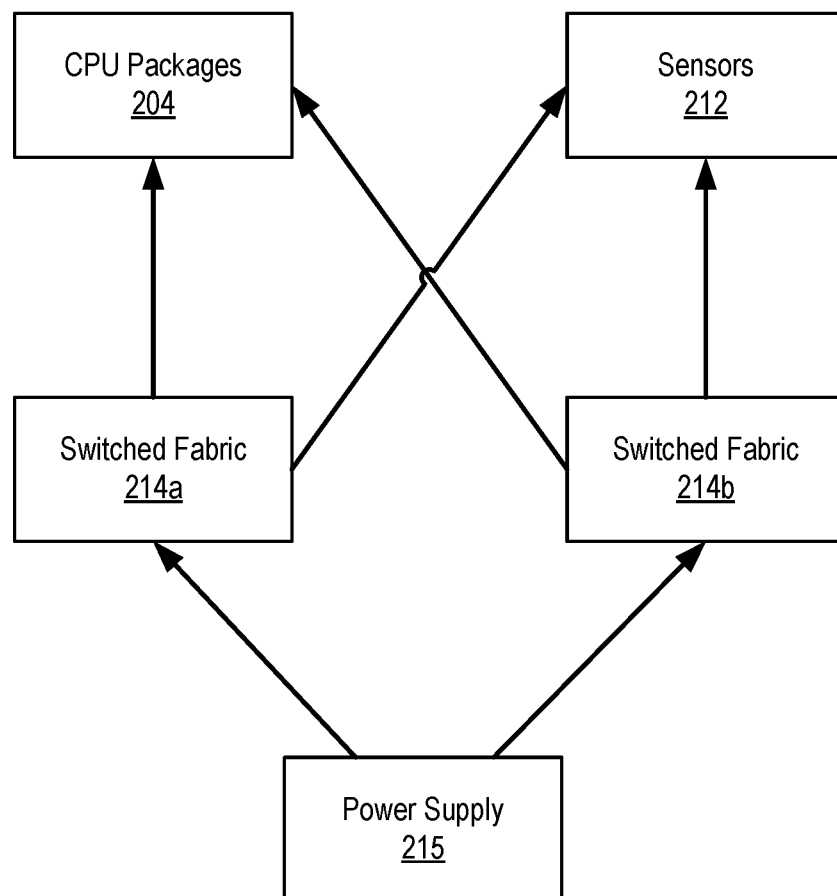
FIG. 3 is a block diagram of a redundant power fabric for device security across multiple operating system modalities.

FIG. 3 shows an example redundant power fabric for an autonomous vehicle having a redundant processor fabric. The redundant power fabric provides redundant pathways for power transfer between the power supplies 215, the sensors 212, the CPU packages 204, and may also be used for power transfer to other components not explicitly depicted in FIG. 3. In this example, the power supplies 215 are coupled to the sensors 212 and CPU packages via two switched fabrics 214a and 214b, although additional redundant resources may be incorporated in accordance with other embodiments of the present disclosure. The topology shown in FIG. 3 provides redundant pathways between the power supplies 215, the sensors 212, and the CPU packages 204 such that power can be rerouted through any of multiple pathways in the event of a failure in an active connection pathway. The switched fabrics 214a and 214b may provide power to the sensors 212 using various connections, including Mobile Industry Processor Interface (MIPI), Inter-Integrated Circuit (I2C), Universal Serial Bus (USB), or another connection. The switched fabrics 214a and 214b may also provide power to the CPU packages 204 using various connections, including Peripheral Component Interconnect Express (PCIe), USB, or other connections. Although only two switched fabrics 214a and 214b are shown connecting the power supplies 215 to the sensors 212 and CPU packages 204, it is understood that the approach shown by FIG. 3 can be modified to include additional switched fabrics 214.

Figure 4:
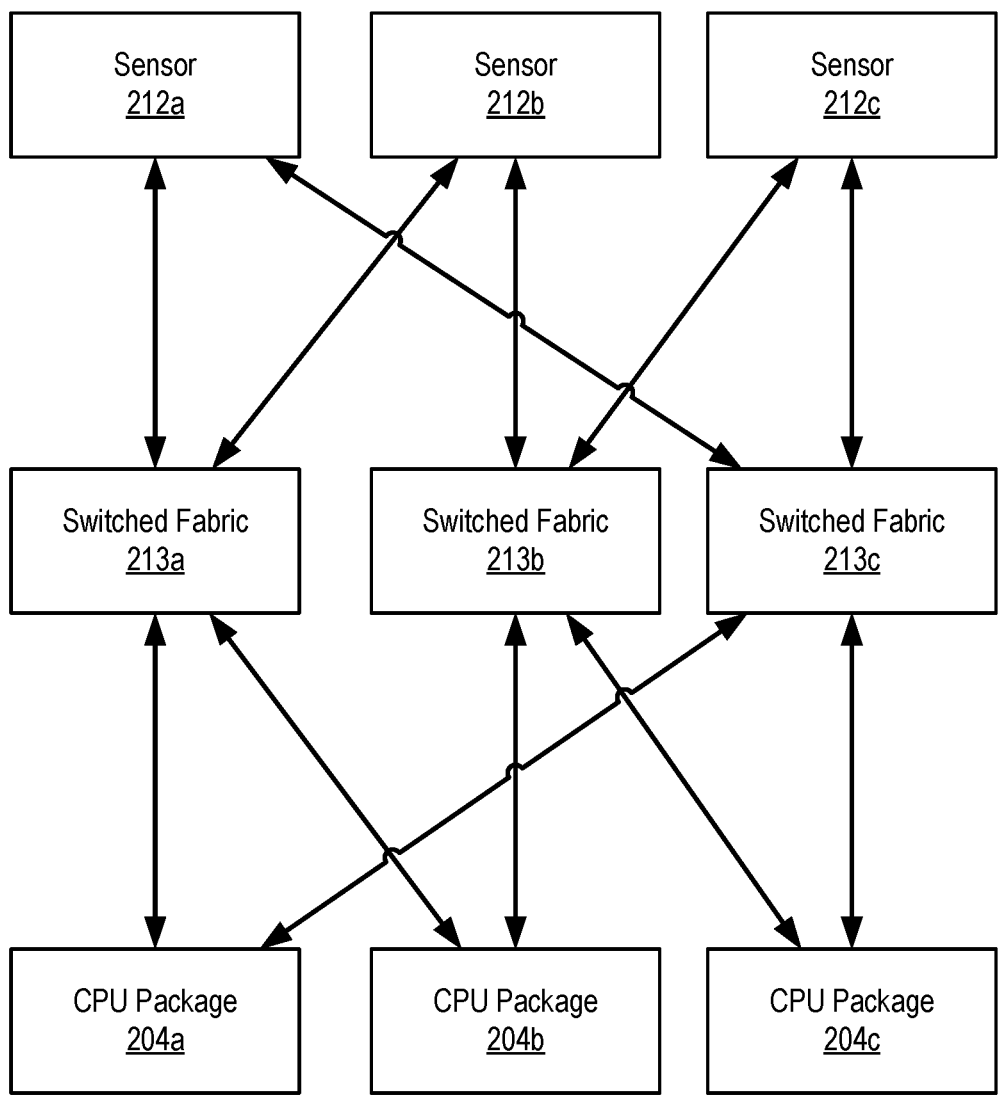
FIG. 4 is a block diagram of a redundant data fabric for device security across multiple operating system modalities.

FIG. 4 is an example redundant data fabric for an autonomous vehicle having a redundant processor fabric. The redundant data fabric provides redundant data connection pathways between sensors 212 and CPU packages 204, and may also provide redundant data connection pathways between other components not explicitly depicted in FIG. 4. In this example view, three CPU packages 204a, 204b, and 204c are connected to three sensors 212a, 212b, and 212c via three switched fabrics 213a, 213b, and 213c. Each CPU package 204a, 204b, and 204c is connected to a subset of the switched fabrics 213a, 213b, and 213c. For example, CPU package 204a is connected to switched fabrics 213a and 213c, CPU package 204b is connected to switched fabrics 213a and 213b, and CPU package 204c is connected to switched fabrics 213b and 213c. Each switched fabric 213a, 213b, and 213c is connected to a subset of the sensors 212a, 212b, and 212c. For example, switched fabric 213a is connected to sensors 212a and 212b, switched fabric 213b is connected to sensor 212b and 212c, and switched fabric 213c is connected to sensors 212a and 212c. Under this topology, each CPU package 204a, 204b, and 204c has an available connection path to any sensor 212a, 212b, and 212c. It is understood that the topology of FIG. 4 is exemplary, and that CPU packages, switched fabrics, sensors, or connections between components may be added or removed while maintaining redundancy as can be appreciated by one skilled in the art.

Figure 5:
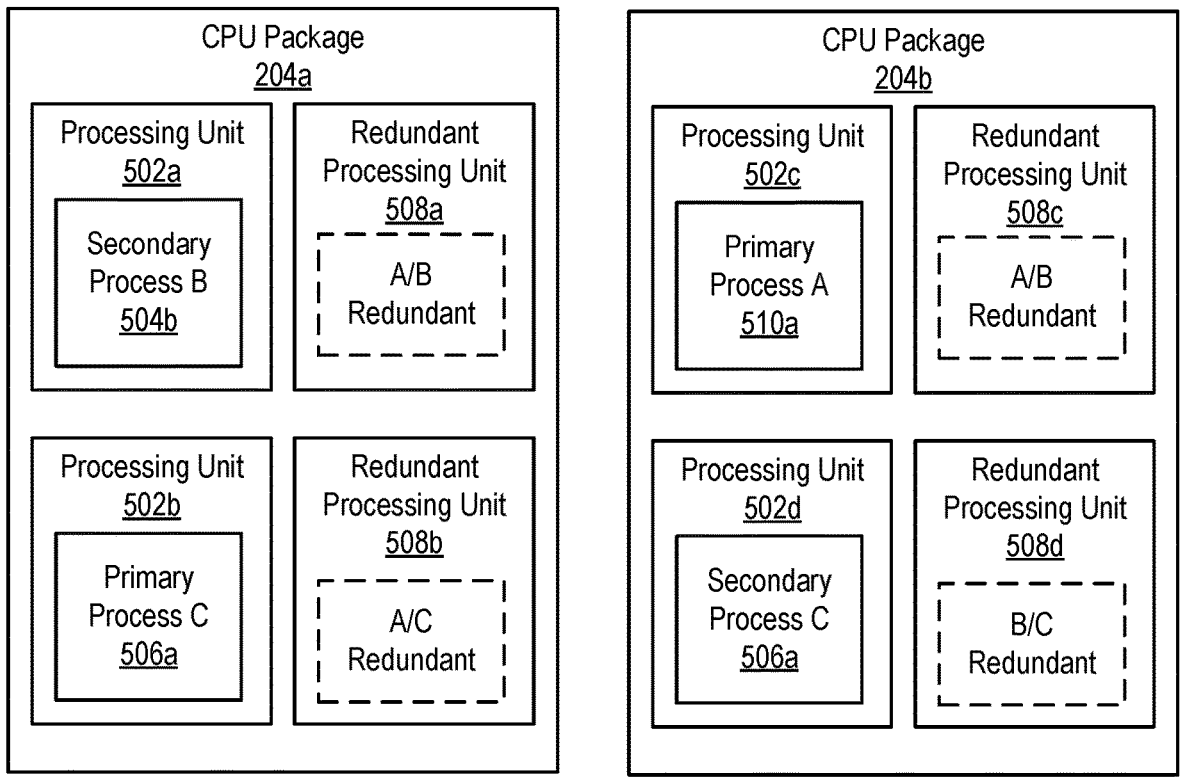
FIG. 5 is an example view of process allocation across CPU packages for device security across multiple operating system modalities.
Figure 5:
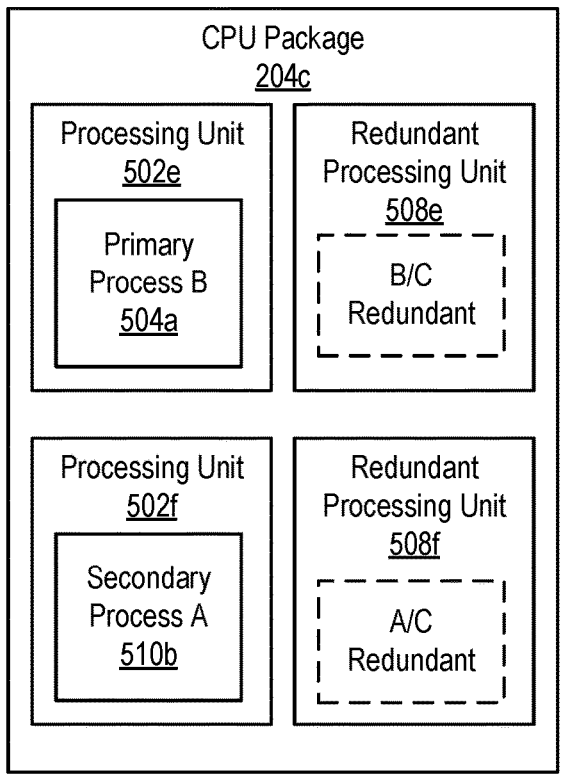

FIG. 5 is an example view of process allocation across CPU packages for a redundant processing fabric in an autonomous vehicle. Shown are three CPU packages 204a, 204b, and 204c. Each CPU package 204a includes a processing unit that has been allocated (e.g., by a hypervisor 228 or other process or service) primary execution of a process and another processing unit that has been allocated secondary execution of a process. As set forth herein, primary execution of a process describes an executing instance of a process whose output will be provided to another process or service. Secondary execution of the process describes executing an instance of the process in parallel to the primary execution, but the output may not be output to the other process or service. For example, in CPU package 204a, processing unit 502a has been allocated secondary execution of "process B," denoted as secondary process B 504b, while processing unit 502b has been allocated primary execution of "process C," denoted as primary process C 506a.

CPU package 204a also comprises two redundant processing units that are not actively executing a process A, B, or C, but are instead reserved in case of failure of an active processing unit. Redundant processing unit 508a has been reserved as "AB redundant," indicating that reserved processing unit 508a may be allocated primary or secondary execution of processes A or B in the event of a failure of a processing unit allocated the primary or secondary execution of these processes. Redundant processing unit 508b has been reserved as "A/C redundant," indicating that reserved processing unit 508b may be allocated primary or secondary execution of processes A or C in the event of a failure of a processing unit allocated the primary or secondary execution of these processes.

CPU package 204b includes processing unit 502c, which has been allocated primary execution of "process A," denoted as primary process A 510a, and processing unit 502d, which has been allocated secondary execution of "process C," denoted as secondary process C 506a. CPU package 204b also includes redundant processing unit 508c, reserved as "AB redundant," and redundant processing unit 508d, reserved as "B/C redundant." CPU package 204c includes processing unit 502e, which has been allocated primary execution of "process B," denoted as primary process B 504a, and processing unit 502f, which has been allocated secondary execution of "process A," denoted as secondary process A 510a. CPU package 204c also includes redundant processing unit 508e, reserved as "B/C redundant," and redundant processing unit 508f, reserved as "A/C redundant."

As set forth in the example view of FIG. 5, primary and secondary instances of processes A, B, and C are each executed in an allocated processing unit. Thus, if a processing unit performing primary execution of a given process fails, the processing unit performing secondary execution may instead provide output of the given process to a receiving process or service. Moreover, the primary and secondary execution of a given process are executed on different CPU packages. Thus, if an entire processing unit fails, execution of each of the processes can continue using one or more processing units handling secondary execution. The redundant processing units 508a-f allow for allocation of primary or secondary execution of a process in the event of processing unit failure. This further prevents errors caused by processing unit failure as parallel primary and secondary execution of a process may be restored. One skilled in the art would understand that the number of CPU packages, processing units, redundant processing units, and processes may be modified according to performance requirements while maintaining redundancy.

Figure 6:
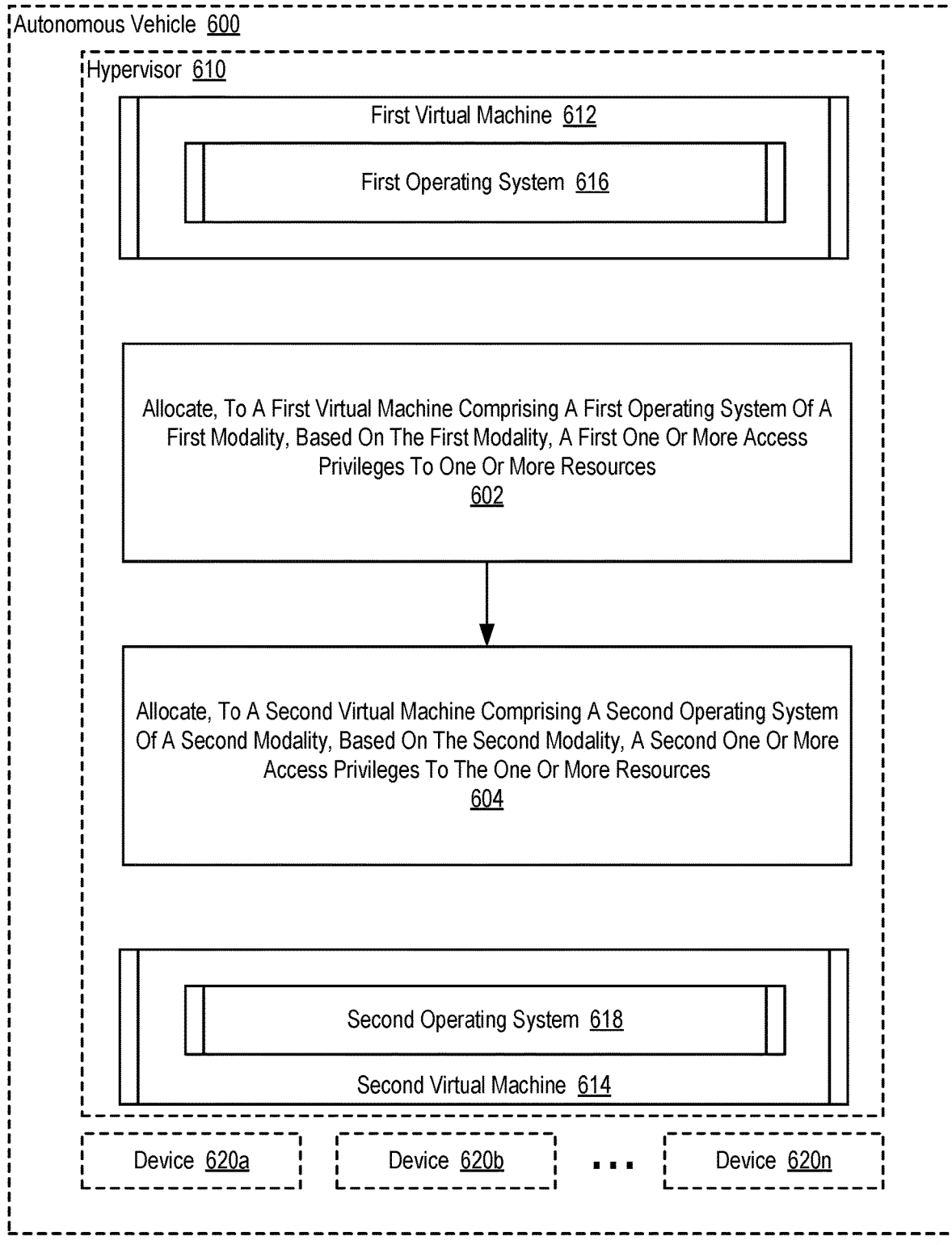
FIG. 6 is a flowchart of an example method for device security across multiple operating system modalities.

For further explanation, FIG. 6 sets forth a flow chart illustrating an exemplary method for device security across multiple operating system modalities that includes allocating 602, by a hypervisor 610, to a first virtual machine 612 comprising a first operating system 616 (e.g., executing a first guest operating system 216) of a first modality, based on the first modality, a first one or more access privileges to one or more resources. The first modality may comprise a real-time modality in that one or more processes executed by the first operating system must be performed according to one or more time constraints. As an example, the first operating system may execute one or more processes associated with the data collection module (described above) in order to process a stream of sensor data from the sensors. The stream of sensor data may need to be processed in substantially real-time (e.g., under one or more time constraints). As a further example, the first operating system 616 may also execute one or more processes associated with the automation module (described above) in order to make determinations as to operational commands to facilitate autonomous operation of the autonomous vehicle 600 (e.g., based on sensor data processed by the data collection module). Such determinations must be made in substantially real-time (e.g., under the one or more time constraints) such that the determined operational commands are based on the most recently detected environmental state and/or operational state of the autonomous vehicle 600, as well as the most recent histories of such environmental states and/or operational states.

As another example, the first modality may comprise a formally verified modality (e.g., the first operating system comprises a formally verified operating system). A first operating system in a formally verified modality is an operating system that has undergone formal verification with respect to a specification using formal proofs. For example, a formally verified operating system may be used to conform with a particular industry standard or to receive a particular industry certification.

The one or more resources may comprise one or more devices 620a, 620b, 620n. The devices 620a, 620b, 620n depicted in FIG. 6 may be included in an autonomous vehicle 600 that is similar to the autonomous vehicles described above and may include, for example, one or more image sensors that are affixed to the autonomous vehicle 600, a GPS receiver that is included in the autonomous vehicle 600, an accelerometer that is included in the autonomous vehicle 600, computing devices and peripherals that are included in the autonomous vehicle 600, and many other types of devices.

The one or more access privileges may comprise one or more of read privileges, write privileges, and/or read/write privileges. The one or more access privileges may also comprise a privilege to access the one or more resources to perform a particular function. For example, the one or more access privileges may define whether a given operating system (e.g., the first operating system 616 of the first virtual machine 612) may use particular dedicated hardware (e.g., the GPU or AI accelerator) to assist in a process or function.

The first one or more access privileges may be based on the first modality of the first operating system 616. Accordingly, the hypervisor 610 may determine the first one or more access privileges by accessing a table or other data structure associating particular modalities with a particular set of access privileges. For example, the data structure may associate formally verified operating systems with a particular set of access privileges, and non-verified operating systems with another set of access privileges. As another example, the data structure may associate real-time operating systems with a particular set of access privileges, and non-verified operating systems with another set of access privileges.

As a further example, where a particular operating system may embody multiple non-exclusive modalities, the data structure may define access privileges based on which combination of modalities a particular operating system embodies. For example, the data structure may define access privileges based on what combination of real-time/non-real-time modalities and verified/non-verified modalities a particular operating system embodies. To make such determinations, the hypervisor 610 may also maintain a record or log indicating the modalities of virtual machines 610 and their corresponding operating systems.

The method of FIG. 6 may further comprise allocating 604, by the hypervisor 610, to a second virtual machine 614 comprising a second operating system 618 (e.g., guest operating system 216) of a second modality, based on the second modality, a second one or more access privileges to the one or more resources. The second modality may be different from the first modality. For example, the second modality may comprise a non-real-time modality, where the second operating system functions independent of the one or more time constraints of the real-time modality. For example, the second operating system 618 may perform one or more processes associated with a data processing module 226. Thus, the second operating system 618 may facilitate the filtering, processing, transformation, storage, or uploading of data. Such operations need not necessarily be performed real-time.

As another example, the second operating system 618 may operate in an unverified modality. In other words, the second operating system 618 is an operating system that has not undergone formal verification. For example, the second operating system 618 may implement network access, internet access, third-party applications, or other functionality that would be too resource intensive to undergo formal verification.

The second operating system 618 of the second virtual machine 614 may be of a second modality relative to the first modality of the first operating system 616 of the first virtual machine 612. For example, where the first virtual machine 612 may comprise a first operating system 616 of a real-time modality, the second virtual machine 614 may comprise a second operating system 618 of a non-real-time modality. As another example, where the first virtual machine 612 may comprise a first operating system 616 of a verified modality, the second virtual machine 614 may comprise a second operating system 618 of a non-verified modality.

As the second one or more access privileges are based on the second modality, and the second modality may be different from the first modality, the second one or more access privileges may be different that the first one or more access privileges. For example, the second one or more access privileges may restrict, deny, or exclude an access right granted by the first one or more access privileges. As an example, the first one or more access privileges may allow the first virtual machine 612 to access a stream of sensor data from a particular sensor 212, while the second one or more access privileges may deny the second virtual machine 614 access to the stream of sensor data. As another example, the first one or more access privileges may allow the first virtual machine 612 to access a GPU 230 to perform one or more processes, while the second one or more access privileges may deny the second virtual machine 614 access to the GPU. Conversely, the first one or more access privileges may restrict, deny, or exclude an access right granted by the second one or more access privileges.

Figure 7:
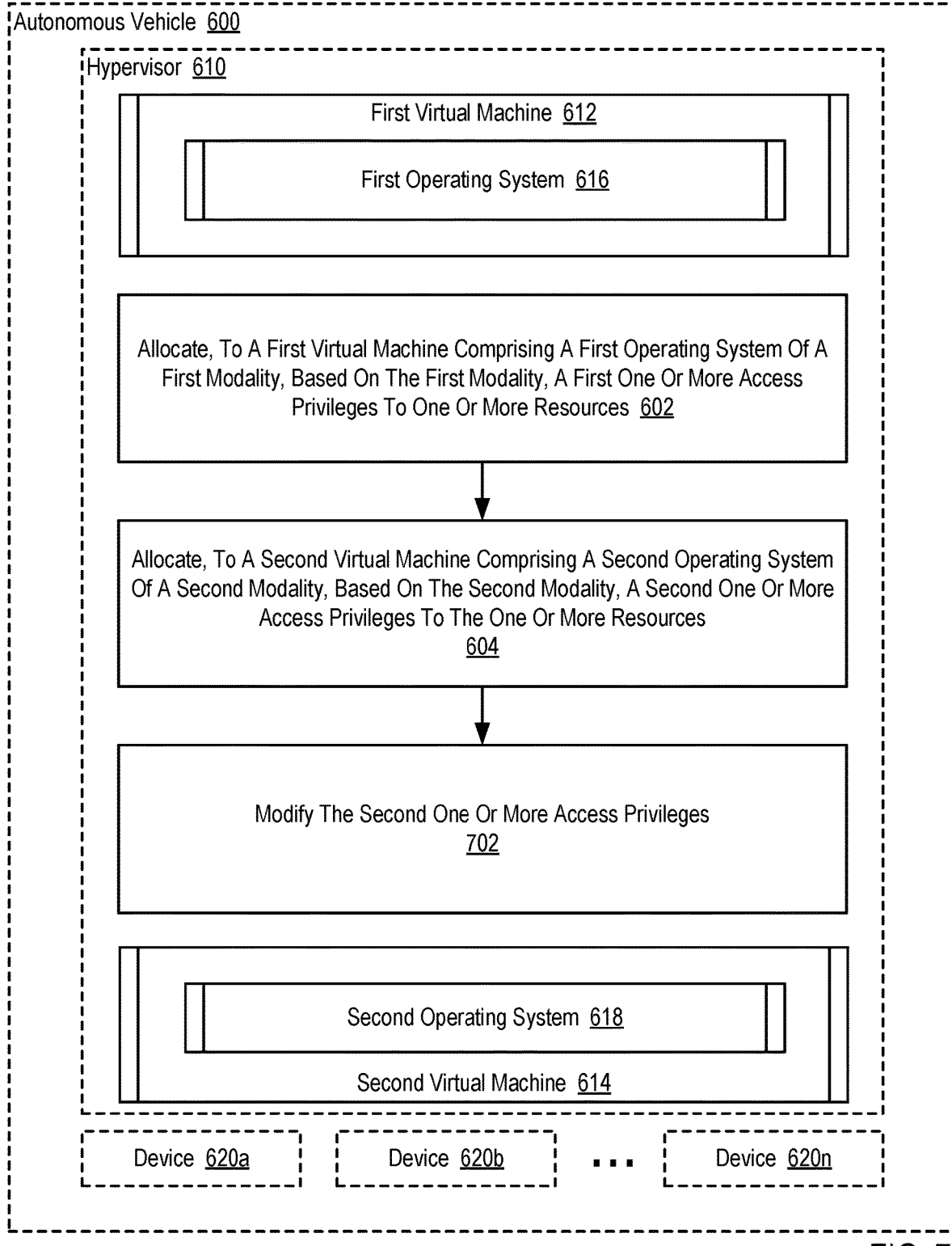
FIG. 7 is a flowchart of an example method for device security across multiple operating system modalities.

For further explanation, FIG. 7 sets forth a flow chart illustrating an exemplary method for device security across multiple operating system modalities that includes allocating 602, by a hypervisor 610, to a first virtual machine 612 comprising a first operating system 616 (e.g., executing a first guest operating system 216) of a first modality, based on the first modality, a first one or more access privileges to one or more resources; and allocating 604, by the hypervisor 610, to a second virtual machine 614 comprising a second operating system 618 (e.g., executing a second guest operating system 216) of a second modality, based on the second modality, a second one or more access privileges to the one or more resources.

The example method depicted in FIG. 7 also includes modifying 702, by the hypervisor 610, the second one or more access privileges. The hypervisor 610 may modify the second one or more access privileges based on a state of the first virtual machine 612. For example, the hypervisor 610 may modify the second one or more access privileges based on an execution state of the first virtual machine 612 (e.g., executing, suspended, terminated, etc.). As an example, the first one or more access privileges allocated to the first virtual machine 612 may allow the first virtual machine 612 access to a particular resource. The second one or more access privileges may deny the second virtual machine 614 access to this particular resource. In response to the first virtual machine 612 ending execution (e.g., the first virtual machine is suspended or terminated), the hypervisor 610 may modify the second one or more access privileges to allow access to the particular resource. In this example, the hypervisor 610 may limit modification of the second one or more access privileges to allow access to the particular resource in response to the first virtual machine 612 being terminated (e.g., shut down and/or allocated computational resources freed) as there is a reduced chance of the first virtual machine 612 resuming execution when compared to suspension. The hypervisor 610 may again modify the second one or more access privileges to remove access to the particular resource in response to the first virtual machine 612 beginning or resuming execution.

The hypervisor 610 may also modify the second one or more access privileges based on a change in the state of the autonomous vehicle 600. A change in the state of the autonomous vehicle 600 may comprise a change in the operational state of the autonomous vehicle. For example, a change in the operational state of the autonomous vehicle 600 may comprise entering or exiting an autonomous driving mode, a potentially autonomous driving mode (e.g., a user-operated driving mode where the autonomous vehicle 600 is capable of entering an autonomous driving mode), a stationary mode (e.g., a parked mode), and so on. A change in the state of the autonomous vehicle may be carried out as the result of a request, user command, remote command to perform a change in the operational state of the autonomous vehicle (e.g., entering or exiting an autonomous driving mode, a potentially autonomous driving mode, or a stationary mode), remote command to enable or disable one or more functions of the autonomous vehicle, or as the result of some other action.

As an example, assume a first virtual machine 612 of a real-time modality has been allocated first one or more access rights granting access to a GPU 230 to facilitate the processing of image or video sensor data by the data collection module 224. The processed sensor data may then be provided to the automation module 220 to facilitate in making autonomous driving decisions. When the autonomous vehicle 600 enters a potentially autonomous driving mode or a stationary mode, however, the first virtual machine 610 may no longer require use of the GPU 230. Accordingly, the hypervisor 610 may modify the second one or more access rights to allow the second virtual machine 614 access to the GPU 230.

A change in the state of the autonomous vehicle 600 may also be carried out as the result of receiving a command disabling one or more functions of the autonomous vehicle 600. For example, a command disabling autonomous driving functions of the autonomous vehicle 600 may be received such that autonomous driving functions are disabled until a software update, firmware update, hardware update, or hardware replacement can occur.

The hypervisor 610 may determine the change in the state of the autonomous vehicle 600 in response to a message or signal indicating the change in the state of the autonomous vehicle 600. For example, the first operating system 616 of the first virtual machine 612, or another process or service can indicate, to the hypervisor 610, the change in the state of the autonomous vehicle 600.

Figure 8:
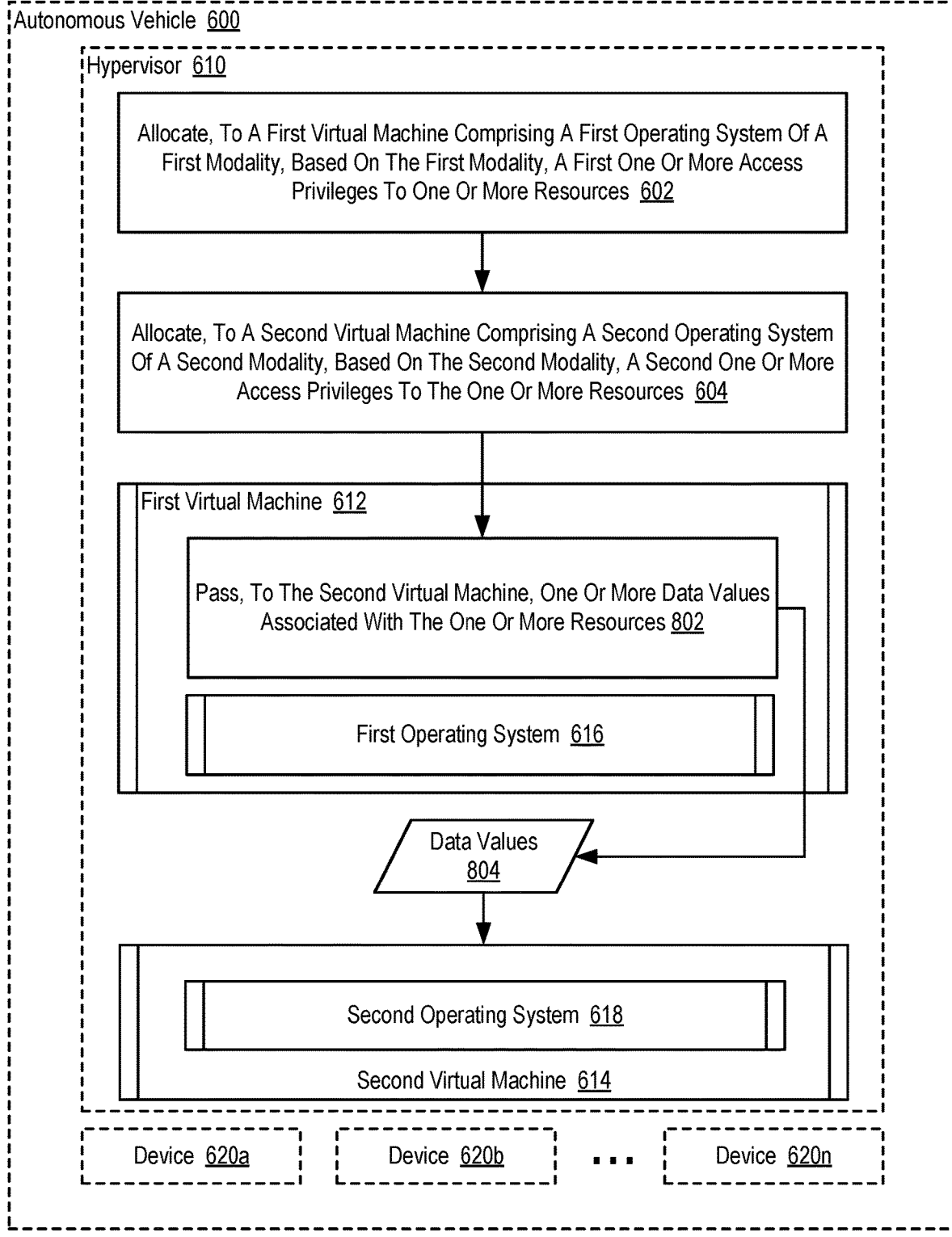
FIG. 8 is a flowchart of an example method for device security across multiple operating system modalities.

For further explanation, FIG. 8 sets forth a flow chart illustrating an exemplary method for device security across multiple operating system modalities that includes allocating 602, by a hypervisor 610, to a first virtual machine 612 comprising a first operating system 616 (e.g., executing a first guest operating system 216) of a first modality, based on the first modality, a first one or more access privileges to one or more resources; and allocating 604, by the hypervisor 610, to a second virtual machine 614 comprising a second operating system 618 (e.g., executing a second guest operating system 216) of a second modality, based on the second modality, a second one or more access privileges to the one or more resources.

The example method depicted in FIG. 8 further comprises passing 802, by the first virtual machine 612 to the second virtual machine 614, one or more data values 804 associated with the one or more resources. For example, the first virtual machine 612 may include the one or more data values in a message to the second virtual machine 614. Sending the message from the first virtual machine 612 to the second virtual machine 614 may be facilitated by the hypervisor 610 (e.g., using the hypervisor 610 as an intermediary between virtual machines 612, 614). As another example, the first virtual machine 612 may store the one or more data values in an area of memory accessible by the second virtual machine 614.

In view of the explanations set forth above, readers will recognize that the benefits of device security across multiple operating system modalities according to embodiments of the present invention include:
  The ability to allocate resource privileges across multiple virtual machines, particularly in an autonomous vehicles.
  The ability to allocate resource privileges based on a particular modality of an operating system of a virtual machine.

Exemplary embodiments of the present invention are described largely in the context of a fully functional computer system for device security across multiple operating system modalities. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that any of the functionality or approaches set forth herein may be facilitated at least in part by artificial intelligence applications, including machine learning applications, big data analytics applications, deep learning, and other techniques. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for device security across multiple operating system modalities comprising:
    allocating, by a hypervisor, to a first virtual machine comprising a first operating system, based on a first modality, a first one or more access privileges to one or more resources;
    allocating, by the hypervisor, to a second virtual machine comprising a second operating system, based on a second modality, a second one or more access privileges to the one or more resources; and
    modifying, by the hypervisor, the second one or more access privileges in response to a change in an execution state of the first virtual machine;
    wherein the hypervisor determines the first one or more access privileges by accessing a table or data structure associated with the first modality or the second modality with the one or more of the access privileges; and
    wherein the hypervisor, the first virtual machine, and the second virtual machine are implemented by an autonomous vehicle.

2. The method of claim 1, wherein the change in the execution state of the first virtual machine comprises one or more of: a suspension of the first virtual machine, a termination of the first virtual machine, or a resuming execution of the first virtual machine.

3. The method of claim 1, wherein the one or more resources comprise one or more devices.

4. The method of claim 1, wherein the first operating system is of a first modality and the second operating system is of a second modality.

5. The method of claim 1, wherein the first operating system comprises a formally verified operating system and the second operating system comprises an unverified operating system.

6. The method of claim 1, further comprising passing, by the first virtual machine to the second virtual machine, one or more data values associated with the one or more resources.

7. An apparatus for device security across multiple operating system modalities, comprising:
    one or more processors and memory, wherein the one or more processors are configured to perform steps comprising:

allocating, by a hypervisor, to a first virtual machine comprising a first operating system, based on a first modality, a first one or more access privileges to one or more resources;

allocating, by the hypervisor, to a second virtual machine comprising a second operating system, based on a second modality, a second one or more access privileges to the one or more resources; and modifying, by the hypervisor, the second one or more access privileges in response to a change in an execution state of the first virtual machine;

wherein the hypervisor determines the first one or more access privileges by accessing a table or data structure associated with the first modality or the second modality with the one or more of the access privileges; and wherein the hypervisor, the first virtual machine, and the second virtual machine are implemented by an autonomous vehicle.

8. The apparatus of claim 7, wherein the change in the execution state of the first virtual machine comprises one or more of: a suspension of the first virtual machine, a termination of the first virtual machine, or a resuming execution of the first virtual machine.

9. The apparatus of claim 7, wherein the one or more resources comprise one or more devices.

10. The apparatus of claim 7, wherein the first operating system is of a first modality and the second operating system is of a second modality.

11. The apparatus of claim 7, wherein the first operating system comprises a formally verified operating system and the second operating system comprises an unverified operating system.

12. The apparatus of claim 7, further comprising passing, by the first virtual machine to the second virtual machine, one or more data values associated with the one or more resources.

13. An autonomous vehicle configured device security across multiple operating system modalities, the autonomous vehicle comprising an apparatus comprising:
one or more processors and memory, wherein the one or more processors are configured to perform steps comprising:
allocating, by a hypervisor, to a first virtual machine comprising a first operating system, based on a first modality, a first one or more access privileges to one or more resources;
allocating, by the hypervisor, to a second virtual machine comprising a second operating system, based on a second modality, a second one or more access privileges to the one or more resources; and
modifying, by the hypervisor, the second one or more access privileges in response to a change in an execution state of the first virtual machine;
wherein the hypervisor determines the first one or more access privileges by accessing a table or data structure associated with the first modality or the second modality with the one or more of the access privileges; and
wherein the hypervisor, the first virtual machine, and the second virtual machine are implemented by the autonomous vehicle.

14. The autonomous vehicle of claim 13, wherein the change in the execution state of the first virtual machine comprises one or more of: a suspension of the first virtual machine, a termination of the first virtual machine, or a resuming execution of the first virtual machine.

15. The autonomous vehicle of claim 13, wherein the one or more resources comprise one or more devices.

16. The autonomous vehicle of claim 13, wherein the first operating system is of a first modality and the second operating system is of a second modality.

17. The autonomous vehicle of claim 13, wherein the first operating system comprises a formally verified operating system and the second operating system comprises an unverified operating system.

18. A computer program product disposed upon a non-transitory computer readable medium, the computer program product comprising computer program instructions for device security across multiple operating system modalities that, when executed, cause a computer system to carry out the steps of:
allocating, by a hypervisor, to a first virtual machine comprising a first operating system, based on a first modality, a first one or more access privileges to one or more resources;
allocating, by the hypervisor, to a second virtual machine comprising a second operating system, based on a second modality, a second one or more access privileges to the one or more resources; and
modifying, by the hypervisor, the second one or more access privileges in response to a change in an execution state of the first virtual machine;
wherein the hypervisor determines the first one or more access privileges by accessing a table or data structure associated with the first modality or the second modality with the one or more of the access privileges; and
wherein the hypervisor, the first virtual machine, and the second virtual machine are implemented by an autonomous vehicle.

\* \* \* \* \*